UNITED STATES PATENT OFFICE.

CHARLES A. WITTMACK, OF NEW YORK, N. Y., ASSIGNOR OF TWO-THIRDS TO W. NEWTON COLLINS AND PIERRE DE P. RICKETTS, BOTH OF SAME PLACE.

DRYING-OIL.

SPECIFICATION forming part of Letters Patent No. 326,467, dated September 15, 1885.

Application filed June 18, 1885. (Specimens.)

*To all whom it may concern:*

Be it known that I, CHARLES A. WITTMACK, a citizen of the United States, residing at the city of New York, in the county of New York, in the State of New York, have invented a new and useful composition of matter to be used as an oil for paints and varnishes, the same being an improvement upon the oil described in Letters Patent of the United States granted to Martin Connelly April 12, 1881, No. 240,094, of which the following is a specification.

My composition consists of the following ingredients combined in about the following proportions, namely: The oil produced as described in said Letters Patent No. 240,094, consisting of petroleum and rosin or rosin-oil, sixty to ninety-five parts; linseed-oil, three to twenty parts; cotton-seed oil, three to twenty parts; drier composed of linseed-oil boiled with manganese binoxide, three to twenty parts.

The exact proportions of these ingredients which I have found to give the best results are as follows, namely: Connelly oil, (consisting of petroleum, forty-six parts, and rosin or rosin-oil, thirty and five-tenths parts,) seventy-six and one-half parts; linseed-oil, ten and one-half parts; cotton-seed oil, four parts; drier, nine parts.

The following ingredients, when prepared in the following manner, are suitable for the drier above mentioned, namely: manganese binoxide, one to four parts; linseed-oil, about six to nine parts. These ingredients forming the drier should be boiled together until the mass becomes ropy—namely, at a temperature of from 250° to 350° Fahrenheit for about two hours. The best proportions for this drier I find to be two parts of manganese binoxide and eight parts of linseed-oil boiled together, as aforesaid.

This drier is boiled with said oils, preferably at a temperature of about 250° Fahrenheit, for about half an hour, and I prefer to use nine parts of the drier in a total mixture of one hundred parts.

When mixed with the oils, I find it of advantage to add to the mixture and to boil with it a small quantity of manganese borate, say about two-tenths of a part.

What I claim, and desire to secure by Letters Patent, is—

An oil for paints and varnishes, consisting of a mixture of petroleum, rosin or rosin-oil, linseed-oil, cotton-seed oil, and manganese binoxide, substantially in the proportions specified.

CHAS. A. WITTMACK.

Witnesses:
C. WYLLYS BETTS,
J. E. HINDON HYDE.